(No Model.)
G. MOLL.
DEVICE FOR OPERATING THE TOOL RESTS OF LATHES.
No. 247,677. Patented Sept. 27, 1881.
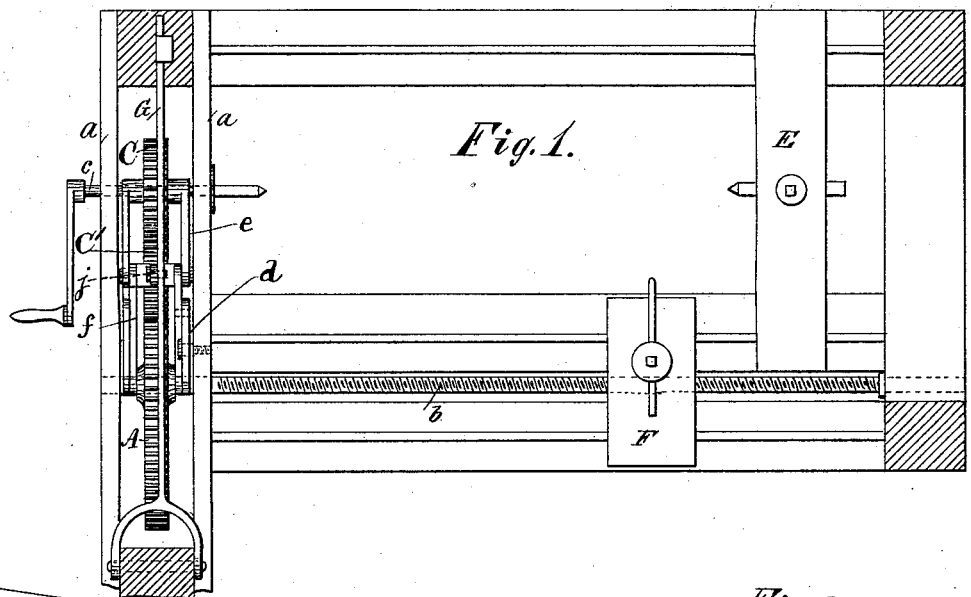
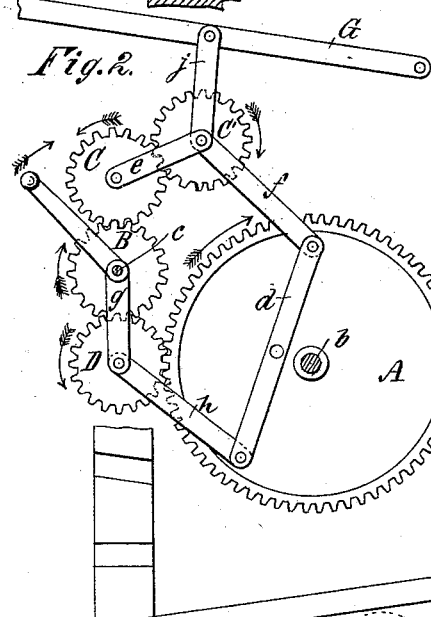
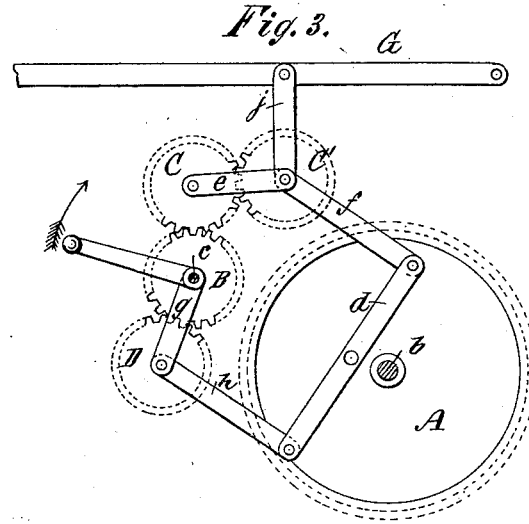
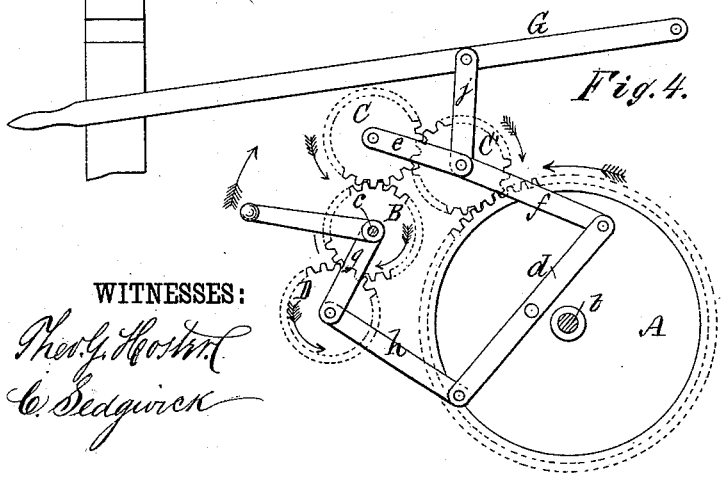
WITNESSES:
INVENTOR:
G. Moll
BY
ATTORNEYS.

UNITED STATES PATENT OFFICE.

GEORGE MOLL, OF MASCOUTAH, ILLINOIS.

DEVICE FOR OPERATING THE TOOL-RESTS OF LATHES.

SPECIFICATION forming part of Letters Patent No. 247,677, dated September 27, 1881.

Application filed June 13, 1881. (No model.)

*To all whom it may concern:*

Be it known that I, GEORGE MOLL, of Mascoutah, in the county of St. Clair and State of Illinois, have invented a new and useful Improvement in Devices for Operating the Tool-Rests of Lathes, of which the following is a full, clear, and exact description.

The object of my invention is to provide improved and cheaply-constructed means whereby the movement of the traveling tool-rest of turning-lathes may be reversed or stopped.

The invention consists of novel link and lever constructions, whereby the gear-wheels which mesh with the power-gear upon opposite side thereof may be brought to alternately engage with the main gear-wheel and impart reverse motion thereto, or be entirely disconnected from the main gear by the movement of the hand-lever.

In the accompanying drawings, Figure 1 is a plan view of my improved lathe. Figs. 2, 3, and 4 are front elevations of the gearing, shown in different positions.

Similar letters of reference indicate corresponding parts.

The body of the frame of the lathe, the tail-block E, and the traveling tool-rest F may be of any suitable construction. The forward end of the frame is formed of the double side pieces, $a\ a$, for housing the gearing. Upon that portion of the screw-shaft $b$ which comes between the side pieces, $a\ a$, is secured the main gear-wheel A, and upon the shaft $c$, which is journaled in the side pieces, is secured the power-gear B, which may be caused to impart motion to the main gear A either by means of the gear-wheels C C' or the gear-wheel D. These wheels are all simultaneously controlled by means of the link mechanism shown, the rocking lever $d$, and the main lever G. The link mechanism consists of the link $e$, which connects the wheels C C', the link $f$, which connects the wheel C' with the upper end of the pivoted lever $d$, the link $g$, which connects the wheel D with the power-wheel B, the link $h$, which connects the wheel D with the lower end of the pivoted lever $d$, and the link $j$, which connects the whole with the main lever G.

It will be understood that when the main lever is raised to its highest point the wheel C' will be lifted out of contact with the main wheel A, and that the wheel D will be brought to engage with the main wheel, as shown in Fig. 2, and thus impart forward motion to the tool-rest; that when the lever is brought to its lowest point the wheel D will be carried out of contact with the main wheel, and the wheel C' brought in contact with it, as shown in Fig. 4, and thus impart a reverse movement to the tool-rest; and, also, that when the lever is brought to the intermedial point, as shown in Fig. 3, both wheels will be moved out of contact with the main wheel, and that the tool-rest will remain still.

Though I have described and shown my invention applied to lathes, it is obvious that it might be applied to any other class of machines where a slow and reversible motion is required without reversing the power and not depart from the spirit of my invention.

Having thus fully described my invention, what I claim as new, and desire to secure by Letters Patent, is—

1. The gear-wheel B, main gear A, and the gear-wheels C, C', and D, in combination with the link and lever mechanism, substantially as described, whereby the gears C, C', and D are simultaneously operated for reversing the main gear, as and for the purposes set forth.

2. In a lathe, the tool-rest F, worm-shaft $b$, main gear A, the power-gear B, and wheels C, C', and D, in combination with the pivoted lever $d$, links $e, f, g, h$, and $j$, and the main lever G, substantially as and for the purposes set forth.

GEORGE MOLL.

Witnesses:
DOMINIQUE SCHAEFFER,
HENRY KIEFER.